US012674011B2

(12) United States Patent
Williamson et al.

(10) Patent No.: US 12,674,011 B2

(45) Date of Patent: Jul. 7, 2026

(54) MODIFIED POLYETHYLENE RESINS AND PROCESS FOR MAKING THE SAME

(71) Applicant: Dow Global Technologies LLC, Midland, MI (US)

(72) Inventors: Alexander Williamson, Rosharon, TX (US); Rahul Sharma, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 582 days.

(21) Appl. No.: 18/254,334

(22) PCT Filed: Aug. 18, 2021

(86) PCT No.: PCT/US2021/046407

§ 371 (c)(1),
(2) Date: May 24, 2023

(87) PCT Pub. No.: WO2022/139885

PCT Pub. Date: Jun. 30, 2022

(65) Prior Publication Data

US 2024/0010772 A1 Jan. 11, 2024

Related U.S. Application Data

(60) Provisional application No. 63/128,929, filed on Dec. 22, 2020.

(51) Int. Cl.

| | |
|---|---|
| ***C08F 210/16*** | (2006.01) |
| ***B29C 48/00*** | (2019.01) |
| ***C08F 4/642*** | (2006.01) |
| ***C08F 4/654*** | (2006.01) |
| ***C08F 4/659*** | (2006.01) |
| ***C08J 3/12*** | (2006.01) |
| ***C08K 5/134*** | (2006.01) |
| ***C08K 5/14*** | (2006.01) |
| ***C08K 5/524*** | (2006.01) |
| ***C08L 23/26*** | (2025.01) |

(52) U.S. Cl.

CPC .......... *C08F 210/16* (2013.01); *B29C 48/022* (2019.02); *C08F 4/6421* (2013.01); *C08F 4/6545* (2013.01); *C08F 4/65916* (2013.01); *C08J 3/12* (2013.01); *C08K 5/1345* (2013.01); *C08K 5/14* (2013.01); *C08K 5/524* (2013.01); *C08L 23/26* (2013.01); *C08F 2810/10* (2013.01); *C08J 2323/08* (2013.01); *C08L 2023/44* (2013.01); *C08L 2207/068* (2013.01)

(58) Field of Classification Search

CPC .... C08F 210/02; C08F 210/16; C08F 110/02; C08F 10/02; C08F 2810/10; C08F 2500/01; C08L 23/26; C08L 2023/40; C08L 2023/44

See application file for complete search history.

(56) References Cited

U.S. PATENT DOCUMENTS

| | | | |
|---|---|---|---|
| 3,003,000 | A | 10/1961 | Milas |
| 4,352,915 | A | 10/1982 | Mashita et al. |
| 5,627,242 | A | 5/1997 | Jacobsen et al. |
| 5,882,750 | A | 3/1999 | Mink et al. |
| 5,925,448 | A | 7/1999 | Moy et al. |
| 6,417,289 | B1 | 7/2002 | Shirodkar et al. |
| 6,445,642 | B2 | 9/2002 | Murakami |
| 7,498,282 | B2 | 3/2009 | Patel et al. |
| 7,847,029 | B2 | 12/2010 | Butler et al. |
| 8,968,851 | B2 | 3/2015 | Walter et al. |
| 8,987,382 | B2 | 3/2015 | Demirors et al. |
| 10,759,927 | B1 | 9/2020 | Karjala et al. |
| 10,759,928 | B2 | 9/2020 | Brown et al. |
| 11,046,841 | B2 | 6/2021 | Lin et al. |
| 11,492,467 | B2 | 11/2022 | Lin et al. |
| 2005/0090464 | A1 | 4/2005 | Visser et al. |
| 2011/0171407 | A1 | 7/2011 | Mazzola et al. |
| 2014/0342141 | A1 | 11/2014 | Cui et al. |
| 2017/0020936 | A1 | 1/2017 | Versalovic et al. |
| 2019/0100644 | A1 | 4/2019 | Williamson et al. |

FOREIGN PATENT DOCUMENTS

| | | |
|---|---|---|
| WO | 2005023912 | 3/2005 |
| WO | 2006045501 | 5/2006 |
| WO | 2008104371 | 9/2008 |
| WO | 201185377 | 7/2011 |
| WO | 201185379 | 7/2011 |
| WO | 2011085371 | 7/2011 |
| WO | 2011085375 | 7/2011 |
| WO | 2012134700 | 10/2012 |
| WO | 2013006409 | 1/2013 |
| WO | 2013101930 | 7/2013 |
| WO | 2015047841 | 4/2015 |
| WO | 2016204951 | 12/2016 |
| WO | 2017112503 | 6/2017 |
| WO | 2017112510 | 6/2017 |

(Continued)

OTHER PUBLICATIONS

Bionov, “All Antioxidants are not Equivalent, The Most Effective Antioxidants are Produced Endogenously” 2016.

Busico, “H NMR Analysis of Chain Unsaturations in Ethene/1-Octene Copolymers Prepared with Metallocene Catalyss at High Temperature”, Macromolecules, 2005, vol. 38, p. 6988.

Jung, “Analysis of Chain Branch of Polyolefins by a New Proton NMR Approach”, Anal. Chem., 2016, vol. 88, pp. 1516-1520.

(Continued)

*Primary Examiner* — Kregg T Brooks

(57) ABSTRACT

The present invention is a process to modify a starting polyethylene resin composition. In the process, a starting polyethylene resin composition is extruded with at least one primary antioxidant and a free-radical generator to make a modified polyethylene resin composition.

15 Claims, No Drawings

(56) References Cited

FOREIGN PATENT DOCUMENTS

| | | |
|---|---|---|
| WO | 2017146981 | 8/2017 |
| WO | 2017172273 | 10/2017 |
| WO | 2017201110 | 11/2017 |
| WO | 2018039968 | 3/2018 |
| WO | 2018160558 | 9/2018 |
| WO | 2018175277 | 9/2018 |
| WO | 2019067239 | 4/2019 |
| WO | 2019105851 | 6/2019 |

OTHER PUBLICATIONS

Milas, "Studies in Organic Peroxides. XXV. Preparation, Separation and Identification of Peroxides Derived from Methyl Ethyl Ketone and Hydrogen Peroxide", J. Am. Chem. Soc, 1959, vol. 81, pp. 5824-5826.

Williams, "The Construction of a Polyethylene Calibration Curve for Gel Permeation Chromatography using Polystyrene Fractions," 1968, vol. 6, p. 621-624.

Zhou, "Analyses of Short Chain Branches in Polyolefins with Improved 1H NMR Spectroscopy", Anal. Chem., 2020, vol. 92, pp. 8350-8355.

PCT/US2021/046407, International Search Report and Written Opinion with a mailing date of Nov. 16, 2021.

MODIFIED POLYETHYLENE RESINS AND PROCESS FOR MAKING THE SAME

TECHNICAL FIELD

Embodiments of the present disclosure generally relate to processes of manufacturing modified polyethylene resins having increased melt strength.

BACKGROUND

Polyethylene resins are used in many applications requiring good physical properties, easy processing, and sufficient melt strength for formation of films, sheets, pipes, tubes, roto- or blow molded articles. It is desirable to improve the melt strength of polyethylene resins to make it easier to process the polymer, such as by blown film, sheet, pipe or tube extrusion or blow molding. Some references report that melt strength of polyethylene resins may be increased by treating with peroxide or other free-radical generator to induce cross-linking or long-chain branching. See the following patents and patent publications: U.S. Pat. No. 6,417,289 B1, US2014/0342141 A1; US2019/0100644 A1; WO2018/039968 A1; WO2019/105851 A1. Polyethylene resins desirably contain antioxidants at a level (concentration) effective to provide resistance against degradation/crosslinking during processing at elevated temperatures (such as extrusion, film blowing etc.) and/or provide the desired lifetime to the final part by resisting oxidation. However, antioxidants inhibit the action of free-radical generators. Overcompensating with too much free-radical generator risks formation of undesirable gels during extrusion.

Accordingly, optimized methods are desired for producing polyethylene resins that have increased melt strength with levels of anti-oxidant that are effective to control oxidative degradation and without formation of excess gels.

Typical way of increasing melt strength of a polyethylene polymer resin is to increase the resin's molecular weight. But this approach disadvantageously results in an increase in the resulting resin's high shear melt viscosity, which in turn increases back pressure in the extruder running at the same output rate. Extruders have maximum back pressure limits above which they cannot be safely or effectively be operated. To extrude an extrudable higher melt viscosity resin at the same back pressure as used for extruding a lower viscosity resin, all other things being equal, the extruder output of a higher viscosity resin may have to be decreased and/or the temperature increased. A process of increasing melt strength of a polyethylene polymer resin and extruding a melt thereof at the same output rate as that used for extruding a starting polyethylene polymer resin without increasing high shear melt viscosity and/or without increasing extruder back pressure is provided herein.

SUMMARY

One embodiment of the present invention, referred to below as aspect 1, is a process to make a modified polyethylene formulation, which process comprises the steps of:

a. Providing a starting polyethylene resin composition (SPEC) containing one or more polyethylene (co)polymer(s), wherein the SPEC has a melt index ($I_2$) of from 0.5 dg/min to 5 dg/min and contains:
   (i) from 0 to no more than 1.5 weight percent (based on the total weight of the SPEC) of a high molecular weight Cumulative Detector Fraction-Light Scattering ($CDF_{LS}$) fraction with a molecular weight (MW) of greater than 5,000,000 grams per mole (g/mol) (a high molecular weight $CDF_{LS}$ fraction) and
   (ii) from 0 to less than 0.3 weight percent (based on the total weight of the SPEC) of an ultra-high molecular weight $CDF_{LS}$ fraction with a molecular weight (MW) of greater than 10,000,000 g/mol (an ultra-high molecular weight $CDF_{LS}$ fraction);
b. Extruding and mixing together in a melt
   (i) the SPEC,
   (ii) a total quantity of one or more primary antioxidants that is effective to provide at least 2001 parts of the one or more primary antioxidants per 1 million parts by weight ("ppmw") of the modified polyethylene formulation, and
   (iii) from 11 to 250 parts of free-radical generator per 1 million parts of the SPEC by weight ("ppmw"), and
   (iv) optionally, total quantity of one or more secondary antioxidants that is effective to provide at least 395 ppmw of the one or more secondary antioxidants in the modified polyethylene formulation, wherein the one or more primary antioxidants and the optional one or more secondary antioxidants (if any) are collectively referred to as the "primary and any secondary antioxidant(s)" (or, simply, the "antioxidant (s)");

wherein the melt is maintained during the mixing and extruding at a temperature and for a time sufficient to substantially decompose the free-radical generator without substantially degrading the polyethylene (co) polymer(s) or the primary and any secondary antioxidant(s) such that a modified polyethylene formulation is produced which has:

(i) A modified polyethylene resin component (MPEC) having
      1. at least 2 weight percent (based on the total weight of MPEC) of a high molecular weight $CDF_{LS}$ fraction with a molecular weight (MW) of greater than 5,000,000 g/mol and
      2. at least 0.3 weight percent (based on the total weight of MPEC) of an ultra-high molecular weight $CDF_{LS}$ fraction with a molecular weight (MW) of greater than 10,000,000 g/mol;
   (ii) a total of at least 2,001 parts of the one or more primary antioxidants per 1 million parts of the MPEC by weight (ppmw); and
   (iii) less than 10 weight percent of polyethylene gels (based on the total weight of MPEC), and
   (iv) optionally, a total of at least 395 ppmw of the one or more secondary antioxidants.

A second embodiment of the present invention, referred to below as aspect 2, is a modified polyethylene formulation made by the process. In particular, unique formulations may have unique combinations of properties, such as density, melt index, melt strength, molecular weight profile (especially with regard to the HMW and UHMW $CDF_{LS}$ fractions), polymer branching, high antioxidant content and low gel content.

A third embodiment of the present invention, referred to below as aspect 3, is a manufactured article comprising the modified polyethylene formulation.

A fourth embodiment of the present invention, referred to below as aspect 4, is a method of controlling movement of a fluid (e.g., gas (e.g., air or water vapor) or liquid e.g., water), the method comprising flowing the fluid through a pipe or irrigation device or preventing passage of the fluid through a film (e.g., geomembrane) of the manufactured article.

DETAILED DESCRIPTION

The process of the current invention uses at least a starting polyethylene resin component (SPEC), one or more primary antioxidants and a free-radical generator to make the formulations of the present invention.

Certain aspects or embodiments are numbered for easy reference. Each of aspects 1 to 4 of the above SUMMARY are incorporated here in their entireties by reference.

Aspect 5. The process of aspect 1 characterized by any one of limitations (i) to (vii): (i) wherein at least some of the from 11 to 250 ppmw of the free-radical generator is added before the adding of the primary and any secondary antioxidant(s); (ii) wherein at least some of the from 11 to 250 ppmw of the free-radical generator is added simultaneously with the adding of the primary and any secondary antioxidant(s); (iii) wherein at least some of the from 11 to 250 ppmw of the free-radical generator is added after the adding of the primary and any secondary antioxidant(s); (iv) a combination of (i) and (ii) but not (iii); (v) a combination of (i) and (iii) but not (ii); (vi) a combination of (ii) and (iii), but not (i); and (vii) a combination of each of (i), (ii), and (iii). Some embodiments are characterized by any one of limitations (i) to (iii): (i) wherein all of the from 11 to 250 ppmw of the free-radical generator is added before the adding of the primary and any secondary antioxidant(s); (ii) wherein all of the from 11 to 250 ppmw of the free-radical generator is added simultaneously with the adding of the primary and any secondary antioxidant(s); and (iii) wherein all of the from 11 to 250 ppmw of the free-radical generator is added after the adding of the primary and any secondary antioxidant(s).

Aspect 6. The invention of any one of aspects 1 to 4 wherein all of the from 11 to 250 ppmw of the free-radical generator is added after or simultaneously with the adding of the primary and any secondary antioxidant(s). In some embodiments all of the from 11 to 250 ppmw of the free-radical generator is added after the adding of the primary and any secondary antioxidant(s).

Aspect 7. The invention of any one of aspects 1 to 6 wherein all of the from 11 to 250 ppmw of the free-radical generator is added simultaneously with the adding of the primary and any secondary antioxidant(s).

Aspect 8. The invention of any one of aspects 1 to 7 wherein the free-radical generator is an organic peroxide having a molecular weight of 200 to 1000 g/mol and the free-radical generator is added in a quantity of 20 to 250 parts free radical generator per one million parts of SPEC, by weight.

Aspect 9. The invention of any one of aspects 1 to 8 characterized by any one of limitations (i) to (iii): (i) wherein the one or more secondary antioxidants is/are used and the total quantity of the one or more secondary antioxidants that is added is effective to provide from 400 to 2000 ppmw of the one or more secondary antioxidants in the modified polyethylene formulation (based on the weight of MPEC); (ii) wherein the MPEP has a total of from 2001 to 4500 ppmw of the one or more primary antioxidants (based on the weight of MPEC); and (iii) both (i) and (ii).

Aspect 10. The invention of any one of aspects 1 to 9 wherein melt strength of the modified polyethylene formulation is at least 2 cN higher than the melt strength of the starting polyethylene resin component.

Aspect 11. The invention of any one of aspects 1 to 10 wherein melt-index ($I_2$) of the modified polyethylene formulation is from 0.05 dg/min. to 2.0 dg/min.

Aspect 12. The invention of any one of aspects 1 to 11 wherein the content of the high molecular weight $CDF_{LS}$ fraction with a molecular weight (MW) of greater than 5,000,000 g/mol in the modified polyethylene formulation is between 2.4 weight percent and 30 weight percent, based on the total weight of MPEC.

Aspect 13. The invention of any one of aspects 1 to 12 wherein the content of the ultra-high molecular weight $CDF_{LS}$ fraction with a molecular weight (MW) of greater than 10,000,000 g/mol in the modified polyethylene formulation is between 0.4 weight percent and 15 weight percent, based on the total weight of MPEC.

Aspect 14. The invention of any one of aspects 1 to 13 wherein the modified polyethylene formulation contains less than 3 weight percent gels based on the weight of MPEC.

Aspect 15. The invention of any one of aspects 1 to 14 wherein the starting polyethylene resin component contains less than 0.20 vinyl groups per 1000 carbon atoms.

Aspect 16. The invention of any one of aspects 1 to 15 wherein the process is carried out in the extruder-pelletizer section of a polyethylene manufacturing plant.

Aspect 17. The invention of any one of aspects 1 to 15 wherein the process is carried out in multiple extruders, by extruding the starting polyethylene resin component on a first extruder with part of the free-radical generator and/or the primary and any secondary antioxidant(s) and then extruding the resulting composition again on a second extruder with the remaining free-radical generator and/or the primary and any secondary antioxidant(s); wherein either: (a) the first and second extruders are in communication with a conveying operation all located in a same polyethylene manufacturing plant and the composition resulting from the first extruder is fed to the second extruder via the conveying operation; or (b) the first and second extruders are located in different manufacturing plants and the composition resulting from the first extruder is transported by via vehicle (e.g., railroad car, truck, boat, or airplane) therebetween. The different manufacturing plants may comprise first and second manufacturing plants wherein the first manufacturing plant is a polyethylene resin manufacturing plant comprising an olefin polymerization reactor and the first extruder (e.g., extruder/pelletizer) and wherein the second manufacturing plant is a polyethylene film manufacturing plant comprising an article manufacturing line (e.g., film manufacturing line) having the second extruder (e.g., an extruder/blown film line). In some embodiments the process comprises (a), not (b). In other embodiments the process comprises (b), not (a). In other embodiments the process comprises (a) and (b). An example of embodiment (b) is wherein a supplier performs the first extruder operation and a customer of the supplier performs the second extruder operation. The transportation feature of embodiment (b) may be performed by the supplier, the customer, or a third party transporter.

Aspect 18. A modified polyethylene formulation made by or of any one of the aspects 1 to 17. In some embodiments the formulation is made by the process of aspect 17, limitation (a) and the formulation is a product of the supplier's operations only. In other embodiments the formulation is made by the process of aspect 17, limitation (b), and the formulation is a joint product of the supplier's operation and the customer's operation.

Aspect 19. A pellet containing the modified polyethylene formulation in aspect 18.

The starting quantity of a particular compound to be effective to provide the targeted concentration thereof in the MPEC under the circumstances can be readily determined by a person of ordinary skill in the art by simply choosing the starting quantity that, if undegraded, would result in the effective to provide amount. The method may be conducted under an inert atmosphere (e.g., molecular nitrogen or argon gas), as in commercial scale manufacturing operations, which would help protect the antioxidant(s) and free-radical generator from degradation during the mixing and extruding step. If any decomposition/degradation of the particular compound during the mixing and extruding step is a concern, then merely using slightly higher quantity (e.g., 1% to 5% higher amount) than that calculated to provide the targeted concentration of the particular compound will yield the effective to provide concentration.

Relative to a starting polyethylene resin composition, embodiments provide a process to maintain density of a polyethylene resin composition, while modifying other properties thereof. The modifying may comprise decreasing the composition's melt index ($I_2$) and decreasing the molecular weight (MW) $CDF_{LS}$ fraction below 100,000 g/mol. The modifying may comprise increasing at least one, alternatively all but one, alternatively each of the following properties significantly: the MW $CDF_{LS}$ fraction above 5,000,000 g/mol; the MW $CDF_{LS}$ fraction above 10,000,000 g/mol; the melt strength; and the complex viscosity at 0.1 radian per second. The modifying may comprise the unchanging properties, the decreasing properties, and the increasing properties.

The modifying aspect of the process may also comprise increasing the z-average molecular weight ($M_z$), the weight-average molecular weight ($M_w$), and/or the number-average molecular weight ($M_n$) of the starting polyethylene resin composition. Without being bound by theory it is believed that the percentage increase of $M_z$ will be greater than the percentage increase of $M_w$, which in turn will be greater than the percentage increase of $M_n$. In some embodiments the percentage increases of $M_z$, $M_w$, and $M_n$, will be the percentage increases shown by the inventive examples IE1 to IE3.

Without being bound by theory it is believed that if the $M_w$ is increased and the $M_w$(conv)/$M_n$(conv) ratio remains unchanged, this may be due to the modifying also increasing the number-average molecular weight ($M_n$) of the starting polyethylene resin composition by about the same percentage amount, such that the ratio remains unchanged.

Relative to a starting polyethylene resin composition, embodiments provide a modified polyethylene resin composition having unchanged molecular weight distribution ($M_w$(conv)/$M_n$(conv)) and density while having other properties that have been beneficially modified. The modified properties may comprise decreased melt index ($I_2$) and decreased the molecular weight (MW) $CDF_{LS}$ fraction below 100,000 g/mol. The modified properties may comprise significantly increased at least one or all but one or each of the following properties: MW $CDF_{LS}$ fraction above 5,000,000 g/mol; the MW $CDF_{LS}$ fraction above 10,000,000 g/mol; the melt strength; and the complex viscosity at 0.1 radian per second. The modified properties may also comprise a slightly increased (e.g., by less than 20%) absolute weight-average molecular weight. The modified properties may comprise the unchanged properties, the decreased properties, and increased properties.

The benefits of the modified properties of the modified polyethylene resin composition relative to the starting polyethylene resin composition from which the former is made include improved (increased) melt strength with minimal impact (i.e., minimal negative affect) on extrudability. Increased melt strength allows extrusion processes for making films, sheets, pipes, tubes, roto- or blow molded articles, such as film blowing processes and pipe extruding processes, to be run in an extruder at higher output rates and/or allows thicker parts to be made with a minimal increase or without increasing back-pressure in the extruder. Also, an extruded heavier part, such as a pipe, may take a longer time to cool, which with prior resins can undesirably result in sagging thereof. Another benefit of the increased melt strength of the modified polyethylene resin component (MPEC) is that heavier or thicker parts made by extruding the MPEC would have less sagging during cooling than that of a comparative part of the same weight or thickness made by extruding the SPEC.

The present process beneficially increases melt strength of the starting polyethylene polymer resin composition (SPEC) without increasing its high shear melt viscosity. Without being bound by theory it is believed that the present process achieves this benefit by introducing long chain branching (LCB) into the SPEC, which increases the melt strength of the resulting modified polyethylene resin composition (MPEC) without significantly increasing the MPEC's number-average molecular weight, $M_n$, and with minimally increasing the MPEC's $M_w$, relative to the SPEC's properties. Thus, at a given extruder back pressure, it is believed that the MPEC may be extruded at the same output rate as the extrusion of the SPEC from which it was made by the process.

Starting Polyethylene Resin Component

The starting polyethylene resin component (SPEC) contains at least one polyethylene (co)polymer. It may comprise a single polyethylene (co)polymer or a blend of two or more polyethylene (co)polymers. Each polyethylene (co)polymer is unmodified, i.e., has not been treated in a post-reactor process with a free-radical generator or molecular oxygen ($O_2$) or a coupling agent (e.g., diphenyl oxide, 4.4'-bis (sulfonyl azide)). The coupling agent and the free-radical generator function in different ways and achieve different results. Without being bound by theory it is believed that, unlike the free-radical generator, the coupling agent mainly functions by inserting its different ends into C—H bonds of different polyethylene chains, thereby forming a covalently-bonded bridging group between the chains.

Polyethylene (co)polymers in the starting polyethylene resin component may include polyethylene homopolymers and/or polyethylene copolymers. Polyethylene homopolymers contain essentially all repeating units derived from ethylene. Polyethylene copolymers contain units derived from ethylene and repeating units derived from one or more different comonomers. The comonomer is preferably an alpha-olefin containing from 3 to 12 carbon atoms ($C_3$-$C_{12}$).

The comonomer is more preferably selected from the group consisting of propylene, 1-butene, 1-pentene, 1-hexene, 4-methyl-1-pentene, 1-heptene, and 1-octene. The comonomer is more highly preferably selected from the group consisting of 1-butene, 1-hexene, or 1-octene. The preferred level of comonomer depends on the comonomer selected and the intended use of the copolymer. Copolymers of ethylene and butene preferably contain from 92 weight percent to 99.95 weight percent units derived from ethylene and from 0.05 weight percent to 8 weight percent units derived from butene. Copolymers of ethylene and hexene preferably contain from 87 weight percent to 99.92 weight percent units derived from ethylene and from 0.08 weight percent to 13 weight percent units derived from hexene. Copolymers of ethylene and octene preferably contain from 83 weight percent to 99.9 weight percent units derived from ethylene and from 0.1 weight percent to 17 weight percent units derived from octene. The comonomer content may be measured using any suitable technique, such as techniques based on nuclear magnetic resonance ("NMR") spectroscopy as described in the "Test Methods" below.

The melt index ($I_2$) of the starting polyethylene resin component ranges from 0.05 dg/min to 5 dg/min. The melt index is preferably at least 0.1 dg/min, more preferably at least 0.3 dg/min and most preferably at least 0.5 dg/min. The melt index is preferably at most 4 dg/min, more preferably at most 3 dg/min and most preferably at most 2 dg/min.

The density of polyethylene (co)polymers in the starting polyethylene resin component preferably ranges from 0.870 $g/cm^3$ to 0.975 $g/cm^3$. All individual values and subranges of 0.870 $g/cm^3$ to 0.975 $g/cm^3$ are included and disclosed herein. For example, in some embodiments, the density ranges from a lower limit of 0.88, 0.900, 0.902, 0.905, 0.907, 0.910, 0.912, 0.915, 0.920, 0.925, 0.930, 0.935, or 0.940 $g/cm^3$ to an upper limit of 0.970, 0.965, 0.960, 0.955, 0.950, 0.945, 0.942, 0.940, 0.937, 0.935, 0.930, 0.927, 0.925, 0.922, or 0.920 $g/cm^3$. In other embodiments, the density ranges from 0.905 $g/cm^3$ to 0.965 $g/cm^3$, 0.905 $g/cm^3$ to 0.960 $g/cm^3$, 0.907 $g/cm^3$ to 0.960 $g/cm^3$, 0.910 $g/cm^3$ to 0.955 $g/cm^3$, 0.910 $g/cm^3$ to 0.950 $g/cm^3$, 0.910 $g/cm^3$ to 0.947 $g/cm^3$, 0.910 $g/cm^3$ to 0.945 $g/cm^3$, 0.910 $g/cm^3$ to 0.9420 $g/cm^3$, or 0.910 $g/cm^3$ to 0.940 $g/cm^3$. Preferred density ranges are from 0.91 $g/cm^3$ to 0.94 $g/cm^3$ for low-density polyethylene, from 0.915 $g/cm^3$ to 0.945 $g/cm^3$ for linear low-density polyethylene, and from 0.93 $g/cm^3$ to 0.97 $g/cm^3$ for high-density polyethylene.

The weight average molecular weight ($M_w$) of the starting polyethylene resin component (SPEC) is preferably at least 75,000 g/mol, more preferably at least 85,000 g/mol, and most preferably at least 95,000 g/mol. The weight average molecular weight ($M_w$) of the starting polyethylene resin component (SPEC) is preferably at most 300,000 g/mol and more preferably at most 250,000 g/mol, more highly preferably at most about 165,000 g/mol and most preferably at most 140,000 g/mol.

Each of the starting polyethylene resin component (SPEC) and the modified polyethylene resin component (MPEC) independently may be characterized by its respective high molecular weight $CDF_{LS}$ fraction with a molecular weight (MW) greater than a given threshold value of MW as defined herein. Examples of such a threshold value of MW are greater than 5,000,000 g/mol and/or greater than 10,000,000 g/mol. The term "fraction" is based on mass fraction determined by $CDF_{LS}$ and refers to the sum of the weight of molecules having an actual molecular weight (MW) greater than the threshold value expressed as a percentage of the total weight of the entire SPEC or entire MPEC, as the component may be, via $CDF_{LS}$. These high molecular weight $CDF_{LS}$ fractions may be determined by the Gel Permeation Chromatography (GPC) and Cumulative Detector Fractions for Low Angle Laser Light Scattering Detector ("$CDF_{LS}$") methods described herein.

The starting polyethylene resin component contains no more than 1.5 weight percent (based on the total weight of the starting polyethylene resin component) of a high molecular weight $CDF_{LS}$ fraction with a molecular weight (MW) of greater than 5,000,000 g/mol. The content of this high molecular weight $CDF_{LS}$ fraction in the starting polyethylene resin component is preferably no more than 1.4 weight percent, and more preferably no more than 1.2 weight percent. There is no preferred minimum content of the high molecular weight $CDF_{LS}$ fraction, which may be as low as 0 weight percent.

The starting polyethylene resin component contains less than 0.3 weight percent (based on the total weight of the starting polyethylene resin component) of an ultra-high molecular weight $CDF_{LS}$ fraction with a molecular weight (MW) of greater than 10,000,000 g/mol. The content of this high molecular weight $CDF_{LS}$ fraction in the polyethylene (co)polymer is preferably no more than 0.2 weight percent and more preferably no more than 0.15 weight percent. There is no preferred minimum content of the ultra-high molecular weight $CDF_{LS}$ fraction, which may be as low as 0 weight percent.

Preferably, the gel content in the starting polyethylene resin component has been minimized. (Gels are crosslinked polymers that are insoluble in xylene). The gel content is preferably no more than 10 weight percent, based on the weight of the starting polyethylene resin component, more preferably no more than 7 weight percent and most preferably no more than 5 weight percent. There is no minimum preferred gel content. For clarity, the modification process in the present invention is not expected to reduce gel content from that in the starting polyethylene resin component, but is expected to minimize the formation of additional (new) gels in the modified polyethylene resin component.

Preferably, the starting polyethylene resin component contains less than 0.20 vinyl groups per 1000 carbon atoms, more preferably less than 0.15 vinyl groups per 1000 carbon atoms, more highly preferably less than 0.10 vinyl groups per 1000 carbon atoms, and most preferably less than 0.05 vinyl groups per 1000 carbon atoms. There is no preferred minimum vinyl content, and the content may be effectively 0, meaning that the vinyl content is too low to be detectable.

Typically the starting polyethylene resin component (SPEC) contains no antioxidant (i.e., no primary antioxidant and no secondary antioxidant) prior to its use in the process. For example, the SPEC may be produced in a polymerization reactor and then used directly in the process. In other embodiments the SPEC contains a total of from greater than 0 to no more than 1500 parts of the one or more primary antioxidants per one-million weight of the SPEC by weight (ppmw), alternatively no more than 1000 ppmw, alternatively no more than 500 ppmw, and alternatively no more than 100 ppm. It is theorized (without intending to be bound) that the primary and any secondary antioxidant(s) dispersed in the starting polyethylene resin component can interfere with the action of the free-radical generator, and so they are preferably not dispersed in the starting polyethylene resin before addition of the free-radical generator.

Polyethylene (co)polymers in the starting polyethylene resin component can be made via gas-phase, solution-phase, or slurry polymerization processes, or any combination thereof, using any type of reactor or reactor configuration known in the art, such fluidized bed gas phase reactors, loop reactors, stirred tank reactors, batch reactors in parallel, series, and/or any combinations thereof. Preferably at least one polyethylene (co)polymer in the polyethylene component is made by a gas-phase process in a fluidized bed reactor, and more preferably all polyethylene (co)polymers in the polyethylene component are made by a gas-phase process in a fluidized bed reactor. Suitable processes involve polymerization of ethylene monomer and optionally comonomers in the presence of a catalyst. Suitable processes, equipment, monomers and catalysts are well-known and commercially available. The catalysts used to make the first polyethylene resins described herein may include Ziegler-Natta, chrome, metallocene, constrained geometry, or single site catalysts. In some embodiments, the polyethylene (co)polymer may be a znLLDPE, which refers to linear polyethylene made using Ziegler-Natta catalysts, a uLLDPE or "ultra linear low density polyethylene," which may include linear polyethylenes made using Ziegler-Natta catalysts, or a mLLDPE, which refers to LLDPE made using metallocene or constrained geometry catalyzed polyethylene. In some embodiments, the polyethylene (co)polymer may be a unimodal LLDPE prepared using a single stage polymerization, e.g., slurry, solution, or gas phase polymerization. In other embodiments, the polyethylene (co)polymer may be a unimodal LLDPE prepared in a loop reactor, for example, in a single stage loop polymerization process. Loop reactor processes are further described in WO/2006/045501 or WO2008104371. Multimodal (e.g., bimodal) (co)polymers can be made by mechanical blending of two or more separately prepared (co)polymer components or prepared in-situ in a multistage or single stage polymerization process. Examples of producing bimodal polyethylene (co) polymers are disclosed in U.S. Pat. No. 4,352,915 (two slurry reactors), U.S. Pat. No. 5,627,242 (two fluidized bed reactors), U.S. Pat. No. 5,925,448 (two fluidized bed reactors), U.S. Pat. No. 6,445,642 (loop reactor followed by a gas phase reactor), and U.S. Pat. No. 5,882,750 (one fluidized bed reactor).

Antioxidants

The process of the present invention uses one or more primary antioxidants. The term "antioxidant" may be abbreviated as "AO". In some embodiments only one primary antioxidant is used, alternatively two or more primary antioxidants are used, alternatively a total of two primary antioxidants are used, alternatively a total of three primary antioxidants are used. In any one of the foregoing embodiments, a secondary antioxidant is not used, alternatively only one secondary antioxidant is used, alternatively two or more secondary antioxidants are used, alternatively only two secondary antioxidants are used, alternatively only three secondary antioxidants are used. Thus some, but not all, embodiments use the one or more primary antioxidants but do not use any secondary antioxidant, whereas other embodiments use both the one or more primary antioxidants and the one or more secondary antioxidants. In some embodiments one primary antioxidant is used and no secondary antioxidant is used, alternatively two primary antioxidants are used and no secondary antioxidant is used. In some embodiments two primary antioxidants and one secondary antioxidant are used, alternatively one primary antioxidant and one secondary antioxidant are used.

Primary antioxidants are defined here as antioxidants that directly react with or scavenge radicals. When two or more primary antioxidants are used, they differ non-tautomerically from each other in their chemical structures and non-tautomerically from the one or more secondary antioxidants, if any, in their chemical structures. They are preferably organic molecules containing hindered phenol moieties, or organic molecules containing hindered amine moieties such as hindered amine light stabilizers (HALS). Examples of hindered phenol containing primary antioxidants are well known in the polyolefin industry and include pentaerythrityl tetrakis(3-(3,5-di-tert-butyl-4-hydroxyphenol)propionate), which is commercially available under the name of IRGANOX™ 1010, or octadecyl 3-(3,5-di-tert-butyl-4-hydroxyphenyl)propionate, which is commercially available under the name IRGANOX™ 1076. Additional examples of hindered phenol containing primary antioxidants are: triethylene glycol-bis-3-(3-tert-butyl-4-hydroxy-5-methylphenyl)propionate (CAS #36443-68-2); tris(3,5-di-tert-butyl-4-hydroxybenzyl)isocyanurate (CAS #27676-62-6); 1,3,5-trimethyl-2,4,6-tris(3,5-di-tert-butyl-4-hydroxybenzyl)benzene (CAS #1709-70-2); hydroquinone monomethyl ether (MEHQ); and butylated hydroxytoluene (BHT). Examples of HALS are butanedioic acid dimethyl ester, polymer with 4-hydroxy-2,2,6,6-tetramethyl-1-piperidine-ethanol (CAS No. 65447-77-0, commercially LOWILITE 62); N,N'-bisformyl-N,N'-bis(2,2,6,6-tetramethyl-4-piperidinyl)-hexamethylenediamine (CAS No. 124172-53-8, commercially Uvinul 4050 H); Chimassorb 944; and Chimassorb 2020.

Secondary antioxidants react with hydroperoxides and are preferably organic phosphites, phosphonites, or thio ether compounds. When two or more secondary antioxidants are used, they differ non-tautomerically from each other in their chemical structures and non-tautomerically from the one or more primary antioxidants in their chemical structures. Exemplary phosphite-type secondary antioxidants include tris(2,4-di-tert-butylphenyl)phosphite, which is commercially available under the name IRGAFOS™ 168, and tris(nonylphenyl)phosphite. Exemplary phosphonite-type secondary antioxidants include [4-[4-bis(2,4-ditert-butylphenoxy)phosphanylphenyl]phenyl]-bis(2,4-ditert-butylphenoxy)phosphane. Exemplary thio ether compound-type secondary antioxidants include dioctadecyl-3,3'-thiodipropionate. A thio ether compound contains a —C—S—C— group wherein the S atom is unsubstituted (e.g., not substituted with an oxygen atom) and the C atoms are not substituted by an oxo (=O) group.

In embodiments wherein the primary antioxidant contains one or more phenolic groups, the molar ratio of the total moles of phenolic groups in the quantity of primary antioxidant used in the process to the total moles of P or S atoms in the quantity of secondary antioxidant used in the process may be from 20.0:1.0 to 1:2, alternatively from 9:1 to 1:1, alternatively from 6:1 to 2:1, alternatively from 4.1:1 to 4.8:1. In embodiments wherein the primary antioxidant is a HALS, the weight ratio of the weight of the HALS used in the process to weight of the secondary antioxidant used in the process may be from 10.0:1.0 to 1.0:2.0, alternatively from 5:1 to 1:1, alternatively from 3:1 to 1:1, alternatively from 1.5:1.0 to 2.4:1.0.

In some embodiments only one primary antioxidant and only one secondary antioxidant are used in the process. In some such embodiments the ratio of the weight of the primary antioxidant used to weight of the secondary antioxidant used is from 1.5:1.0 to 2.4:1.0, alternatively from 1.8:1.0 to 2.2:1.0, alternatively from 1.9:1.0 to 2.1:1.0, alternatively from 1.96:1.00 to 2.04:1.00, alternatively 2.0:1.0. In some embodiments the one primary antioxidant and the one secondary antioxidant are used in the process in a molar ratio of total moles of phenolic OH groups in the quantity of the one primary antioxidant used in the process to total moles of phosphorous atoms in the quantity of the one secondary antioxidant used in the process is equal to from 3.4:1.0 to 5.4:1.0, alternatively from 4.0:1.0 to 4.8:1.0, alternatively from 4.18:1.0 to 4.62:1.0, alternatively from 4.3:1.0 to 4.5:1.0, alternatively 4.4:1.0. In some embodiments the primary antioxidant is pentaerythrityl tetrakis(3-(3,5-di-tert-butyl-4-hydroxyphenol)propionate) and the secondary antioxidant is tris(2,4-di-tert-butylphenyl)phosphite. In some such embodiments the free-radical generator is 3,6,9-triethyl-3-6-9-trimethyl-1,4,7-triperoxonane peroxide.

Concentrations of primary antioxidants and secondary antioxidants are discussed later in the discussion on the modified polyethylene resin formulation.

Free Radical Generator (FRG)

The process of this invention uses a free-radical generator. Examples of suitable free-radical generators include azo compounds, organic peroxides and inorganic peroxides. The free-radical generator is preferably an organic peroxide and more preferably a cyclic organic peroxide.

The free radical generator preferably has a molecular weight from 200 to 1,000 g/mol. All individual values and subranges of from 200 to 1,000 g/mol are included and disclosed herein. For example, in some embodiments, the free radical generator may have a molecular weight from 225 to 1000 g/mol, 250 to 1000 g/mol, or 250 to 700 g/mol.

An example of a suitable cyclic peroxide may be represented by the formula:

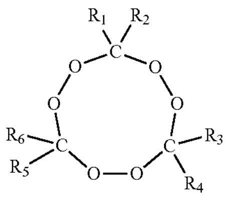

wherein R1-R6 are independently hydrogen or an inertly-substituted or unsubstituted C1-C20 alkyl, C3-C20 cycloalkyl, C6-C20 aryl, C7-C20 aralkyl, or C7-C20 alkaryl. Representative of the inert-substituents included in R1-R6 are hydroxyl, C1-C20 alkoxy, linear or branched C1-C20 alkyl, C6-C20 aryloxy, halogen, ester, carboxyl, nitrile, and amido. In some embodiments, R1-R6 are each independently lower alkyls, including, for example, C1-C10 alkyl, or C1-C4 alkyl.

Some cyclic peroxides are commercially available, but cyclic peroxides can also be made by contacting a ketone with hydrogen peroxide as described in U.S. Pat. No. 3,003,000; Uhlmann, 3rd Ed., Vol. 13, pp. 256-57 (1962); the article, "Studies in Organic Peroxides XXV Preparation, Separation and Identification of Peroxides Derived from Methyl Ethyl Ketone and Hydrogen Peroxide," Milas, N. A. and Golubovic, A., J. Am. Chem. Soc, Vol. 81, pp. 5824-26 (1959); "Organic Peroxides", Swern, D. editor, Wiley-Interscience, New York (1970); and Houben-Weyl Methoden der Organische Chemie, El 3, Volume 1, page 736.

Examples of the other cyclic peroxides include those derived from acetone, methylamyl ketone, methylheptyl ketone, methylhexyl ketone, methylpropyl ketone, methylbutyl ketone, diethyl ketone, methylethyl ketone methyloctyl ketone, methylnonyl ketone, methyldecyl ketone and methylundecyl ketone. The cyclic peroxides can be used alone or in combination with one another.

In some embodiments, the cyclic peroxide may be 3,6,9-triethyl-3-6-9-trimethyl-1,4,7-triperoxonane, which is commercially available in solution under the trade designation TRIGONOX 301. The cyclic peroxide used herein can be liquid, solid, or paste depending on the melting point of the peroxide and the diluent, if any, within which it is carried.

The free radical generator preferably has a half-life at 220° C. of less than 200 seconds, more preferably less than 195 seconds and most preferably less than 175 seconds. The free radical generator preferably has a half-life at 220° C. of at least 50 seconds, more preferably at least 75 seconds and most preferably at least 100 seconds.

The free radical generator preferably has a decomposition energy greater than (i.e., more negative than) −250 kJ/mol, more preferably greater than −350 kJ/mol and more highly preferably greater than −450 kJ/mol and most preferably greater than −750 kJ/mol. The free radical generator preferably has a decomposition energy less than (i.e., less negative than) −1250 kJ/mol, more preferably less than −1100 kJ/mol and most preferably less than −890 kJ/mol. Decomposition Energy is measured by the Decomposition Energy Test Method described below.

The free radical generator can be used neat or dissolved in a solvent. Alternatively, the free radical generator can be incorporated into a masterbatch formulation with a polyolefin carrier resin.

Masterbatch formulations contain free-radical generator mixed with a polyolefin carrier resin. The carrier resin is preferably compatible with the starting polyethylene resin component so that the two resins will blend smoothly during melting and extrusion. The carrier resin preferably does not contain any primary or secondary antioxidants.

The free-radical generator may be melt-blended with particles or pellets of the carrier resin or it may be applied to the surface of particles or pellets of the carrier resin.

The free-radical generator is preferably applied to the surface of the carrier resin, such as by dispersing a liquid solution of the free-radical generator over the carrier resin pellets or particles and allowing the free-radical generator to absorb into the resin. This step is preferably carried out at temperatures below 100° C. and more preferably at ambient temperature.

If the free-radical generator is melt-blended into the carrier resin particles or pellets, then the carrier resin preferably softens at a temperature low enough that substantial decomposition of the free-radical generator does not occur during the blending process. For masterbatches that contain the preferred peroxide free-radical generators, the carrier resin preferably softens to permit mixing below 200° C., and more preferably below 190° C. The softening temperature of the carrier resin is preferably high enough to permit ordinary handling and storage of the masterbatch without clumping. The softening temperature is preferably above 100° C. and more preferably above 110° C.

The masterbatch preferably contains at least 0.025 weight percent free-radical generator, more preferably at least 0.05 weight percent and most preferably at least 0.09 weight percent. It preferably contains no more than 2.0 weight percent free-radical generator and more preferably at most 1.0 weight percent.

Methods to prepare masterbatches by dispersing a liquid solution of the free-radical generator over carrier resin pellets or particles are well known in the polyethylene industry and are described in numerous references, such as in a Henschel mixer.

In some embodiments the free-radical generator is 3,6,9-triethyl-3-6-9-trimethyl-1,4,7-triperoxonane peroxide.

Process

In the process of this invention, the starting polyethylene resin component, the primary and any secondary antioxidant(s) and the free-radical generator are extruded together in a melt under conditions that cause the free-radical generator to decompose and generate free radicals. Without being bound, it is theorized that the introduction of the inventive free radical generators described herein produces long chain branches or similar structure into the polymer, thereby increasing melt strength and/or low shear viscosity.

In the extrusion step, the starting polyethylene resin component is melted in the extruder and combined with the primary and any secondary antioxidant(s) and the free-radical generator under conditions to thoroughly blend them and decompose the free-radical generator. All components may be pre-contacted or pre-mixed together before the start of the extrusion at a temperature below the melting temperature of the SPEC, or alternatively the primary and any secondary antioxidant(s) and/or the free-radical generator may be fed into the extruder downstream from the inlet where the starting polyethylene resin component enters the extruder. Alternatively, the process of this invention may be carried out on multiple extruders, such as by extruding the starting polyethylene resin component on a first extruder with part of the added components (the free-radical generator and/or the primary and any secondary antioxidant(s)) and then extruding the resulting composition again on a second extruder with the remaining free-radical generator and/or the primary and any secondary antioxidant(s). In such a system, the first extruder may be the extruder-pelletizer section of a polyethylene manufacturing plant and the second extruder may be an extruder to produce the final article such as a film, sheet, pipe, or tube.

The free-radical generator preferably is added to the starting polyethylene resin component before, or alternately at the same time as, alternatively after the primary and any secondary antioxidant(s). More preferably, the free radical generator is added to the mixture at the same time as the primary and any secondary antioxidant(s). Without being bound by theory, it is believed that adding the free-radical generator before or at the same time as the antioxidant(s) permits the free radical generator to initiate the long-chain branching coupling before the primary and any secondary antioxidant(s) become fully dispersed within the mixture and interfere with the free-radical generator.

The one or more primary antioxidants may be added at the same time as or at a different time than the adding of the one or more secondary antioxidants, if any. When two or more primary antioxidants are added, they may be added at the same time or at different times. Likewise when two or more secondary antioxidants are added, they may be added at the same time or at different times.

The expression "is added" when referring to the one or more primary antioxidants, the one or more secondary antioxidant, and/or the free-radical generator comprises any effective method of combining same with the starting polyethylene resin composition (SPEC) so as to ultimately give an extrudable mixture thereof. Some embodiments of "is added" include an indirect method comprising pre-contacting at least one of the one or more primary antioxidants, the one or more secondary antioxidants, and/or the free-radical generator with a solid form (e.g., powder, granules, or pellets) of the SPEC to give a solids premixture thereof (i.e., the at least one of the one or more primary antioxidants, the one or more secondary antioxidants, and/or the free-radical generator is added to the SPEC solids), and melting the SPEC solids in the solids premixture to give the extrudable mixture. Other embodiments of "is added" include a direct method comprising adding at least one of the one or more primary antioxidants, the one or more secondary antioxidants, and/or the free-radical generator to a melt of the SPEC (i.e., the at least one of the one or more primary antioxidants, the one or more secondary antioxidants, and/or the free-radical generator is added to the SPEC melt) to give the extrudable mixture. Embodiments of the "is added" also include combinations of the indirect and direct methods such as a combination method comprising adding the one or more primary antioxidants to the solid form of the SPEC to give a solids premixture comprising the one or more primary antioxidants and the SPEC solids, but not the free-radical generator (i.e., the one or more primary antioxidants, but not the free-radical generator is added to the SPEC solids); melting the SPEC solids to give a premelt comprising the one or more primary antioxidants (in liquid or solid form, as their melting points may be) and a melt of the SPEC, but not the free-radical generator; and adding the free-radical generator to the premelt to give the extrudable mixture (i.e., the free-radical generator, but not the primary antioxidant, is added to the SPEC premelt). The one or more secondary antioxidants, if used, may be added to the SPEC solids or to the SPEC premelt.

The extrusion can be carried out in customary polyethylene extrusion equipment. For example, mixers, kneaders and extruders are commercially available, and their use is known to those skilled in the art. Exemplary extruder or kneader equipment includes, for example, single-screw extruders, contra-rotating and co-rotating twin-screw extruders, planetary-gear extruders, ring extruders, or co-kneaders. Suitable extruders and kneaders are further described, for example, in Handbuch der Kunststoftextrusion, Vol 1 Grundlagen, Editors F. Hensen, W. Knappe, H. Potente, 1989, pp. 3-7, ISBN.3-446-14339-4 (Vol 2 Extrusionsanlagen 1986, ISBN 3-446-14329-7). In embodiments herein, the screw length can range from 1-60 times the screw diameter, or 35-48 times the screw diameter. The rotational speed of the screw may range from 10-600 rotations per minute (rpm), or 25-300 rpm. The maximum throughput is dependent on the screw diameter, the rotational speed, and the driving force. The process of the present invention can also be carried out at a level lower than maximum throughput by varying the parameters mentioned or employing weighing machines delivering dosage amounts.

The total quantity of the one or more primary antioxidants and the total quantity of the one or more secondary antioxidants added during extrusion are generally similar to the final total quantity of the one or more primary antioxidants and the final total quantity of the one or more secondary antioxidants in the modified polyethylene resin formulation that is described below. Depending on the process, it may be preferable to add a slightly higher quantity, because some may be consumed by free-radicals generated during the process.

The free-radical generator is added to the starting polyethylene resin component in a ratio of 11 to 250 parts free radical generator per one million parts of SPEC by weight (ppmw). The ratio of free-radical generator to polyethylene resin component is preferably at least 20 ppmw. The ratio of free-radical generator to polyethylene resin component is preferably at most 180 ppmw and more preferably at most 104 ppmw.

Optionally, other additives that are suitable for polyethylene resin compositions may be added in the extrusion step. Examples of suitable additives include dyes and other colorants, stabilizers, UV stabilizers and absorbers, compatibilizers, nucleators, plasticizers, processing aids, slip agents, anti-blocks, neutralizers, and fillers. Excluding fillers, the polyethylene resin component preferably makes up at least 80 weight percent of the melted composition, more preferably at least 90 weight percent and most preferably at least 95 weight percent. Excluding fillers, the polyethylene resin component preferably makes up at most 99.99 weight percent of the melted composition, more preferably at most 99.9 weight percent and most preferably at most 99.8 weight percent.

During extrusion, the mixture should be maintained at a temperature above the melting point of the polymers and the decomposition temperature of the free-radical generator for a sufficient period of time to substantially decompose the free radical generator. Preferably, the time and temperature are low enough to avoid substantial degradation of the polyethylene resin component or the antioxidants.

The best time and temperature for extrusion vary widely based on the components that are extruded and the details of the extruder and its screw(s). They are typically determined for individual compositions and equipment by experimentation and can be determined without undue experimentation. The following embodiments are preferred for the most preferred SPEC, antioxidants and free-radical generator master-batch, using ordinary polyethylene extrusion equipment and screws. The melt temperature at the extrusion die is preferably at least 200° C., more preferably at least 205° C. and most preferably at least 210° C. The melt temperature at the extrusion die is preferably at most 250° C., more preferably at most 230° C. and most preferably at most 220° C. The residence time in the extruder is preferably at least 0.5 minutes and more preferably at least 1 minute. The residence time in the extruder is preferably at most 20 minutes. The melting and extrusion are preferably carried out under an inert atmosphere, such as under nitrogen or a noble gas. The inert atmosphere preferably contains less than 1 mole percent (mol %) of molecular oxygen ($O_2$) based on total amount of the inert gas atmosphere and more preferably less than 0.5 mole percent of molecular oxygen ($O_2$) based on total amount of the inert gas atmosphere. In the case when the antioxidant is added at the extruder of a manufacturing plant and the free radical generator is added during a second melting and extrusion step at an extruder to produce the final article such as a film, sheet, pipe, or tube, the second melting and extrusion process does not need to be carried out under inert conditions due to the fact that the antioxidant is already well dispersed in the resin. The process of this invention is preferably carried out in the extruder-pelletizer section of a polyethylene manufacturing plant. It is more preferably carried out in the extruder-pelletizer section of a polyethylene manufacturing plant that includes a gas-phase fluidized-bed polyethylene reactor.

The process of this invention could also be carried out directly on an extruder to produce the final article such as a film, sheet, pipe, or tube. The process if this invention could also be carried out partially in the extruder-pelletizer section of a polyethylene manufacturing plant and partially in an extruder to produce the final article such as a film, sheet, pipe, or tube.

The content of high molecular weight polyethylene (having a molecular weight (MW) of at least 5,000,000 g/mol) in the modified polyethylene resin composition is preferably at least 1 weight percent higher than the content in the SPEC based on the total weight of polyethylene, more preferably at least 1.5 weight percent higher, more highly preferably at least 2 weight percent higher and most preferably at least 3 weight percent higher.

The content of ultrahigh molecular weight polyethylene (having a molecular weight (MW) of at least 10,000,000 g/mol) in the modified polyethylene resin composition is preferably at least 0.2 weight percent higher than the content in the SPEC based on the total weight of polyethylene, more preferably at least 0.4 weight percent higher, more highly preferably at least 1 weight percent higher and most preferably at least 2 weight percent higher.

Modified Polyethylene Resin Formulation

The Product of this Process is a Modified Polyethylene Resin Formulation that Contains a. A modified polyethylene resin component (MPEC) that contains:
   (i) at least 2 weight percent (based on the total weight of MPEC) of a high molecular weight Cumulative Detector Fraction-Light Scattering ($CDF_{LS}$) fraction with a molecular weight (MW) of greater than 5,000,000 g/mol, and
   (ii) at least 0.3 weight percent (based on the total weight of MPEC) of an ultra-high molecular weight $CDF_{LS}$ fraction with a molecular weight (MW) of greater than 10,000,000 g/mol, and
b. a total of at least 2,001 parts of one or more primary antioxidants per 1 million parts of the MPEC by weight (ppmw).

The modified polyethylene resin component (MPEC) is derived from the starting polyethylene resin component described above. It has the same limits and preferred embodiments, except for the molecular weight profile.

The melt index ($I_2$) of the modified polyethylene resin formulation typically ranges from 0.01 dg/min to 4 dg/min. The melt index is preferably at least 0.05 dg/min, more preferably at least 0.1 dg/min, more highly preferably at least 0.2 dg/min and most preferably at least 0.25 dg/min. The melt index is preferably at most 2 dg/min, more preferably at most 1 dg/min and most preferably at most 0.5 dg/min.

The weight average molecular weight ($M_W$) of the modified polyethylene resin component (MPEC) is preferably at least 77,000 g/mol, more preferably at least 95,000 g/mol, and most preferably at least 140,000 g/mol. The weight average molecular weight ($M_W$) of the modified polyethylene resin component (MPEC) is preferably at most 425,000 g/mol and more preferably at most 270,000 g/mol, and most preferably at most 220,000 g/mol.

The modified polyethylene resin component (MPEC) contains at least 2 weight percent (based on the total weight of MPEC) of a high molecular weight $CDF_{LS}$ fraction with a molecular weight (MW) of greater than 5,000,000 g/mol. It preferably contains at least 2.1 weight percent of the high molecular weight $CDF_{LS}$ fraction, more preferably at least 2.4 weight percent, more highly preferably at least 3 weight percent and most preferably at least 4 weight percent. It preferably contains at most 30 weight percent of the high molecular weight $CDF_{LS}$ fraction, more preferably at most 20 weight percent, more highly preferably at most 15 weight percent and most preferably at most 10 weight percent.

Within this high molecular weight $CDF_{LS}$ fraction, the modified polyethylene resin component (MPEC) further contains at least 0.3 weight percent (based on the total weight of MPEC) of an ultra-high molecular weight $CDF_{LS}$ fraction with a molecular weight (MW) of greater than 10,000,000 g/mol. It preferably contains at least 0.4 weight percent of the ultra-high molecular weight $CDF_{LS}$ fraction, more preferably at least 0.5 weight percent, more highly preferably at least 1 weight percent and most preferably at least 1.5 weight percent. Ultrahigh molecular weight content above 2 percent or 2.5 percent is achievable. It preferably contains at most 15 weight percent of the ultra-high molecular weight $CDF_{LS}$ fraction, more preferably at most 10 weight percent, more highly preferably at most 8 weight percent, and most preferably at most 5 weight percent.

The formulation further contains the one or more primary antioxidants (as already described) in a total concentration of at least 2,001 parts per 1 million parts of the MPEC by weight (ppmw). The total concentration of the one or more primary antioxidants is preferably at most 4990 ppmw, more preferably at most about 4500 ppmw and most preferably at most 3990 ppmw.

The formulation may further contain the one or more secondary antioxidants. The total concentration of the one or more secondary antioxidants is preferably at least 400 parts per 1 million parts of the MPEC by weight (ppmw), more preferably at least 800 ppmw, and most preferably at least 1000 ppmw. The total concentration of the one or more secondary antioxidants is preferably at most 2000 ppmw and more preferably at most 1900 ppmw.

Alternatively, the formulation may be free of (i.e., contain a total concentration of 0 ppmw of) the one or more secondary antioxidants.

The sum of the total concentration of the one or more primary antioxidants plus the total concentration of the one or more secondary antioxidants is preferably more than 2600 parts per 1 million parts of the MPEC by weight (ppmw) and more preferably more than 3000 ppmw. The sum of the total concentration of the one or more primary antioxidant plus the total concentration of the one or more secondary antioxidants is preferably less than 10,000 ppmw and more preferably less than 5,000 ppmw.

The formulation contains less than 10 weight percent gels based on the weight of MPEC. The formulation preferably contains less than 5 weight percent gels based on the weight of MPEC, and more preferably less than 3 weight percent more highly preferably less than 1 weight percent and most preferably less than 0.1 weight percent. There is no minimum preferred gel content.

The formulation preferably contains less than 20 parts of residual free-radical generator per 1 million parts of the MPEC, by weight (ppmw). The residual free-radical generator meets the description and preferred embodiments given previously. The residual free-radical generator content is more preferably at most 15 ppmw, more highly preferably at most 10 ppmw and most preferably at most 5 ppmw. There is no minimum preferred level of residual free-radical generator.

Optionally, the formulation may contain other suitable additives as described previously, such as dyes and other UV stabilizers and absorbers, processing aids, anti-blocks, neutralizers, nucleators, colorants, stabilizers, compatibilizers, plasticizers, slip agents and fillers. The preferred concentrations of these other additives are as described previously.

The modified polyethylene resin formulation has the same density limits and preferred densities as are listed for the starting polyethylene formulation. When the modified polyethylene is a low density or linear low-density polyethylene, its density is preferably from 0.91 g/cm$^3$ to 0.94 g/cm$^3$. When the modified polyethylene is a high density polyethylene, its density is preferably from 0.93 g/cm$^3$ to 0.97 g/cm$^3$.

The melt strength of the modified polyethylene formulation is preferably at least 1 cN higher than the melt strength of the starting PE resin composition, more preferably at least 2 cN higher, more highly preferably at least 3 cN higher and most preferably at least 4 cN higher. Typically, the melt strength of the modified polyethylene formulation is at most 20 cN higher than the melt strength of the starting PE resin composition.

The modified polyethylene resin formulation is preferably formed into pellets, fibers, films, pipes, tubes or other shaped articles at the end of the extrusion. The modified polyethylene resin formulation is more preferably formed into pellets, which can be further extruded later to form fibers, films, pipes, tubes or other shaped articles. Pellets preferably have dimensions between 2 mm & 2 cm in longest dimension, and more preferably have volume between 2 mm$^3$ and 2 cm$^3$.

The high concentration of antioxidants makes the modified polyethylene resin formulation especially suitable for end use in films, fabrics, pipes, tubes, and shaped articles that are extruded under harsh conditions (high temperatures and/or residence times) or used in outdoor applications. It is especially useful for films, pipes, and irrigation lines and parts, such as emitters.

Test Methods

Density: Density is measured according to ASTM D792, Method B.

Melt Index: Melt index, or $I_2$, is measured according to ASTM D1238 at 190° C., 2.16 kg.

Melt Index: High load melt index, or $I_{21}$, is measured according to ASTM D1238 at 190° C., 21.6 kg.

Melt Flow Ratio: the high load melt index divided by the melt index or $I_{21}/I_2$. $I_{21}/I_2$ is calculated from the $I_{21}$ value, measured by the ad rem method, by the $I_2$ value, measured by the ad rem method.

Melt Strength: Melt strength is measured at 190° C. using a Goettfert Rheotens 71.97 (Goettfert Inc.; Rock Hill, S.C.), melt fed with a Goettfert Rheotester 2000 capillary rheometer equipped with a flat entrance angle (180 degrees) of length of 30 mm and diameter of 2 mm. The pellets are fed into the barrel (L=300 mm, Diameter=12 mm), compressed and allowed to melt for 10 minutes before being extruded at a constant piston speed of 0.265 mm/s, which corresponds to a wall shear rate of 38.2 s$^{-1}$ at the given die diameter. The extrudate passes through the wheels of the Rheotens located at 100 mm below the die exit and is pulled by the wheels downward at an acceleration rate of 2.4 mm/s$^2$. The force (in cN) exerted on the wheels is recorded as a function of the velocity of the wheels (mm/s). Melt strength is reported as the plateau force (cN) before the strand breaks.

Vinyl Content: It is well known to use NMR spectroscopic methods for determining polyethylene unsaturation, for example see Busico, V., et al., Macromolecules, 2005, 38, 6988. A stock solution (3.26 g) is added to approximately 0.13 g of the polymer sample in a 10 mm NMR tube. The stock solution is a mixture of tetrachloroethane-d2 (TCE) and perchloroethylene (50:50, w:w) with 0.001M Cr(AcAc3) relaxation agent. The solution in the tube is purged with N2, for 5 minutes, to reduce the amount of oxygen. The sample is dissolved at 115° C. with periodic vortex mixing. Each 1H NMR analysis is run with a 10 mm cryoprobe, at 120° C., on Bruker AVANCE 600 MHz spectrometer. The chemical shift reference is set at 6.0 ppm for the 1H signal from residual proton from TCE-d2. The spectra are acquired with a ZG pulse, NS=64, D1 (relaxation delay)=14 s.

In each spectrum the integral (Itotal) from about −0.5 to 3 ppm is used as the signal from the whole polymer. The number of total carbons, NC, in the polymer is calculated as follows in Equation 1A:

$$NC=I\text{total}/2 \quad \text{(Eqn. 1A).}$$

The resonances from about 5 to 5.15 ppm, corresponding to two protons per vinyl unsaturation Ivinyl are integrated. The number of vinyl unsaturation units are calculated as follows:

$$N\text{vinyl}=I\text{vinyl}/2 \quad \text{(Eqn. 2A),}$$

The unsaturation units per 1,000 total carbons, i.e., all polymer carbons including backbone and branches, are calculated as:

$$N\text{vinyl}/1{,}000C=(N\text{vinyl}/\text{NCH2})*1{,}000 \quad \text{(Eqn. 3A),}$$

- Comonomer Content: Comonomer content in PE copolymers is measured using 13C NMR analysis as described in U.S. Pat. No. 7,498,282; Jung et al., "Analysis of Chain Branch of Polyolefins by a New Proton NMR Approach", ACS Publications 10.1021/acs.analchem.5b04357; and Zhou et al, "Analyses of Short Chain Branches in Polyolefins with Improved 1H NMR Spectroscopy", Anal. Chem. 2020, 92, 8350-8355.
- Antioxidant Concentration: Loadings of antioxidants IRGANOX™ 1010, IRGANOX™ 1076, IRGAFOS™ 168, and tris(nonylphenyl)phosphite ("TNPP") are measured by reversed phase liquid chromatography using an Agilent 1260 liquid chromatograph equipped with a Zorbax Eclipse XDB-C8, 5-μm particle, 4.6×12.5 mm guard column coupled to a Zorbax, Eclipse XDB-C8, 3.5 μm particle, 4.6×50 mm column, and UV absorbance detection at a wavelength of 210 nm). The polymer resin sample (1 g) is dissolved in 25 mL hot o-xylene followed by reprecipitation of the polymer either into 50 mL methanol (IRGANOX™ 1010, IRGANOX™ 1076, IRGAFOS™ 168), or 50 mL isopropanol (TNPP). After the polymer resin sample has settled, an aliquot of the supernatant is filtered (0.2 μm PTFE syringe filter) into a 2 mL glass autosampler vial and the vial is capped with a Teflon lined crimp cap. The vials are placed in the LC autosampler for analysis in duplicate and the average concentration was reported. Quantitation was performed using an external standardization procedure based on peak areas.
- FRG Content: Pellets are extracted with three aliquots of methylene chloride (24 hours soaking time for each extraction). The aliquots are combined, and the concentration of peroxide is quantified by Gas Chromatography, using a calibration curve created using the neat peroxide (or solution of peroxide as supplied).
- FRG Half-Life: The thermal decomposition of free radical generators (FRGs) is measured in a 10% w/w solution in C20H42 (eicosane) using a SensysEvo DSC instrument (Setaram, France). The 10% w/w solution of the FRG in C20H42 (eicosane) is measured under temperature scanning mode in the temperature interval from 75° C. to 350° C. at five different scanning rates, namely 1° C./min, 2.5° C./min, 5° C./min, 10° C./min, and 20° C./min, respectively. About 60 mg of sample is loaded into 170 mL Al pans and placed into the DSC instrument at 75° C. (above the melting point of paraffin) under a nitrogen atmosphere (20 cc/min). After thermal equilibration, the temperature is scanned according to the above-mentioned temperature program and the thermograms were recorded. Exothermic peaks are recorded in the temperature intervals from 120° C. to 320° C. The amount of heat released, −ΔHr (J/g), is determined from the DSC curves for each specimen, which allows for calculation of the reaction progress/conversion with temperature. The kinetic parameters describing the decomposition rate law are determined both by isoconversional methods (using the AKTS Thermokinetic Software, AKTS AG, Switzerland) and the best fitting parameters according to the Sestak-Berggren autocatalytic model. The activation energy, $E_a$ (kJ/mol), and the apparent pre-exponential factor, In⟦A(α)·f(α)⟧ (s−1(−)) as a function of decomposition progress, a, is determined using the Friedman differential isoconversional method and the Ozawa integral isoconversional method. The general form of Sestak-Berggren equation is given below:

$$\frac{d\alpha}{dt} = A \cdot \exp - E_a/RT\alpha^m(1-\alpha)^n$$

and the activation energy, $E_a$, the pre-exponential factor, A, and the reaction orders, m and n, in the above equation are determined by the best fitting method. The $E_a$, A, m, and n parameters can then be used to calculate the FRG half-life at any temperature using the AKTS Thermokinetic Software.

FRG Decomposition Energy & Peak Decomposition Temperature: Differential Scanning calorimetry (DSC) is used to measure the decomposition energies and peak decomposition temperatures, using a TA Instruments Q2000 DSC, equipped with an RCS (refrigerated cooling system). A 0.5-2 mg sample is placed in a glass capillary tube, weighed, and flame sealed under nitrogen while being kept cool using a "cold finger" device. Analysis is then performed to determine its thermal properties.

The thermal behavior of the sample is determined by ramping the sample temperature up to create a heat flow versus temperature profile. First, the sample is heated from 0° C. to 400° C., at a rate of 10° C./min. Next, the sample is cooled. The sample is then heated again (this is the "reheat" ramp) at a 10° C./minute heating rate. Both heating curves are recorded. The initial heat curve is analyzed by setting baseline points from the beginning to the end of thermal activity. The reheat is used to assist in the determination of integration start and end.

For the free radical generators, the peak temperature is recorded as well as the total decomposition energy by integration of the area between the curve of the first heat cycle and the baseline. If the decomposition is exothermic, then the area between the curve and the baseline is integrated as negative because there is negative heat flow. That is, the sample generates heat. If the sample is endothermic such that it takes heat, then the area is integrated as a positive number.

The heat under the exotherm peak is divided by the purity to extrapolate to 100% pure radical generator.

Gel Permeation Chromatography (GPC) and Cumulative Detector Fractions for Low Angle Laser Light Scattering Detector or, Simply, "Cumulative Detector Fraction-Light Scattering" ("$CDF_{LS}$")

Molecular weights, and Gel Content are determined using Gel Permeation Chromatography, using cumulative detector fractions (CDF) for the low angle laser light scattering detector ("$CDF_{LS}$") to calculate the low molecular weight $CDF_{LS}$ fraction, HMW $CDF_{LS}$ Fraction, UHMW $CDF_{LS}$ Fraction.

For our measurements, the chromatographic system consisted of a PolymerChar GPC-IR (Valencia, Spain) high temperature GPC chromatograph equipped with an internal IR5 infra-red detector (IR5) and 4-capillary viscometer (DV) coupled to a Precision Detectors (Now Agilent Technologies) 2-angle laser light scattering (LS) detector Model 2040. For all the light scattering (LS) measurements, the 15 degree angle is used. The autosampler oven compartment was set at 165° Celsius and the column compartment was set at 155° Celsius. The columns used were TSKgel GMHHHR-H(30 μm Particle size) HT2. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliter/minute.

The Systematic Approach for the determination of multi-detector offsets was done in a manner consistent with that published by Balke, Mourey, et. al., optimizing triple detector log (MW and IV) results from a broad homopolymer polyethylene standard ($M_w/M_n>2.7$) to the narrow standard column calibration results from the narrow standards calibration curve using PolymerChar GPCOne™ Software. As used herein, "MW" refers to molecular weight and MWD refers to molecular weight distribution. Polydispersity index ("PDI" or $M_w/M_n$) is one way of characterizing molecular weight distribution (MWD).

The absolute molecular weight data was obtained in a manner consistent with that published by Zimm and Kratochvi using PolymerChar GPCOne™ software. The overall injected concentration, used in the determination of the molecular weight, was obtained from the mass detector area and the mass detector constant, derived from a suitable linear polyethylene homopolymer with a known molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a standard with a known molecular weight of 120,000 g/mol. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). Viscometer constant (obtained using GPCOne™) is calculated which relates specific viscosity area (DV) and injected mass for the calibration standard to its intrinsic viscosity (IV). The chromatographic concentrations are assumed low enough to eliminate addressing 2nd virial coefficient effects (concentration effects on molecular weight).

The absolute weight average molecular weight ($M_w$(Abs)) is obtained (using GPCOne™) from the area of the Light Scattering (LS) integrated chromatogram (factored by the light scattering constant) divided by the mass recovered from the mass constant and the mass detector (IR5) area at each elution volume. The molecular weight and intrinsic viscosity responses are extrapolated at chromatographic ends where signal to noise becomes low (using GPCOne™) The $M_n$(Abs) is calculated according to equation 1 as follows:

$$Mn_{(Abs)} = \frac{\sum^{i} IR_i}{\sum^{i} (IR_i / M_{Absolute_i})} \quad (1)$$

Calibration of the GPC column set was performed with 21 narrow molecular weight distribution polystyrene standards with molecular weights ranging from 580 g/mol to 8,400,000 g/mol and were arranged in 6 "cocktail" mixtures with at least a decade of separation between individual molecular weights. In some instances, the 21 narrow calibration was extended to 23 by using a 10,000,000 g/mol and a 15,000,000 g/mol narrow PS standard. In general, the polystyrene standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80° C. with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$MW_{polyethylene} = A \times (MW_{polystyrene})^B \quad (3)$$

where MW is the molecular weight, A has a value of 0.4315 and B is equal to 1.0.

Unless otherwise stated, a third order polynomial was used to fit the respective polyethylene-equivalent calibration points. A small adjustment to A (from approximately 0.3950 to 0.440) was made to correct for column resolution change over column usage such that linear homopolymer polyethylene standard is obtained at 120,000 g/mol $M_w$. The total plate count of the GPC column set was performed with decane (prepared at 0.04 g in 50 milliliters of TCB.) The plate count (Equation 4) and symmetry (Equation 5) were measured on a 200-microliter injection according to the following equations:

$$\text{Plate Count} = 5.54 * \left( \frac{RV_{Peak\ Max}}{\text{Peak Width at } \frac{1}{2} \text{ height}} \right)^2 \quad (4)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (5)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 12,000 and symmetry should be between 0.98 and 1.22.

Mass recovery was determined in a way consistent with that used within PolymerChar GPCOne Software using the total signal areas of a sample eluted by the GPC method via IR5 broad filter detector and adjusted using a mass constant (MC) as determined with a vendor recommended polyethylene homopolymer standard.

$$\text{Mass Recovered}=\Sigma[\![ Ci/MC ]\!]$$

$$\text{Nominal Injected Mass}=\text{Concentration/Injected volume}$$

$$\text{Mass Recovery}=(\text{Mass Recovered/Nominal Injected Mass})\times 100$$

The mass that is not recovered is insoluble and is treated as the gel content.

Samples were prepared in a semi-automatic manner with the PolymerChar "Instrument Control" Software, wherein the samples were weight-targeted at 1 mg/ml, and the solvent (contained 200 ppm BHT) was added to a pre nitrogen-sparged septum-capped vial, via the PolymerChar high temperature autosampler. The samples were dissolved for 3 hours at 165° Celsius under low orbital shaking.

The calculations of $M_n$(conv) and $M_w$(conv) were based on GPC results using the internal IR5 detector (measurement channel) of the PolymerChar GPC-IR chromatograph according to Equations 6-8, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn(conv) = \frac{\sum^i IR_i}{\sum^i (IR_i / M_{polyet\ hylene_i})} \quad (6)$$

$$Mw(conv) = \frac{\sum^i (IR_i * M_{polyet\ hylene_i})}{\sum^i IR_i} \quad (7)$$

$$Mz(conv) = \frac{\sum^i (IR_i * M^2_{polyethylene_i})}{\sum^i (IR_i * M_{polyethylene_i})} \quad (8)$$

In the low molecular weight region of the GPC elution curve, when the presence of a significant peak that is known to be caused by the presence of anti-oxidant or other additives, the presence of such peak will cause an underestimation of the number average molecular weight ($M_n$) of the polymer sample to give an overestimation of the sample polydispersity defined as $M_w/M_n$, where $M_w$ is the weight average molecular weight. The true polymer sample molecular weight distribution can therefore be calculated from the GPC elution by excluding this extra peak when present. This process is commonly described as the peak skim feature in data processing procedures in liquid chromatographic analyses. In this process, this additive peak is skimmed off from the GPC elution curve before the sample molecular weight calculation is performed from the GPC elution curve.

In order to monitor pump performance over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated. The first derivative of the quadratic equation is then used to solve for the true peak position. After calibrating the system based on a flow marker peak, the effective flowrate (with respect to the narrow standards calibration) is calculated as Equation 9. Processing of the flow marker peak was done via the PolymerChar GPCOne™ Software. Acceptable flowrate correction is such that the effective flowrate should be within +/−0.5% of the nominal flowrate.

CDF Calculation Method

The calculation of the cumulative detector fractions (CDF) for the low angle laser light scattering detector ("$CDF_{LS}$") are accomplished by the following steps:

1. Linearly flow correct the chromatogram based on the relative retention volume ratio of the air peak between the sample and that of a consistent narrow standards cocktail mixture.
2. Correct the light scattering detector offset (effective offset) relative to the IR-5 as described in the Gel Permeation Chromatography (GPC) section.
3. Calculate the molecular weights at each retention volume (RV) data slice based on the polystyrene calibration curve, modified by the polystyrene to polyethylene conversion factor of approximately (0.395-0.440) as described in the Gel Permeation Chromatography (GPC) section.
4. Subtract baselines from the light scattering and IR-5 chromatograms and set integration windows using standard GPC practices making certain to integrate all the low molecular weight retention volume range in the light scattering chromatogram that is observable from the IR-5 chromatogram (thus setting the highest RV limit to the same index in each chromatogram). Do not include any material in the integration which corresponds to less than 150 Dalton in either chromatogram.
5. Calculate the cumulative detector fraction (CDF) of the Low-Angle Laser Light Scattering (LALLS) chromatogram ($CDF_{LS}$) based on its baseline-subtracted peak height (H) from high to low molecular weight (low to high retention volume) at each data slice (j) according to Equations 9, 10 and 11.

$$CDF_{LS \le 100{,}000\ MW} = \frac{\sum_{j=RV\ at\ 100{,}000\ MW}^{j=RV\ at\ Highest\ Integrated\ Volume} Hj}{\sum_{j=RV\ at\ Lowest\ Integrated\ Volume}^{j=RV\ at\ Highest\ Integrated\ Volume} Hj} \quad (9)$$

$$CDF_{LS \ge 5{,}000{,}000\ MW} = \frac{\sum_{j=RV\ at\ Lowest\ Integrated\ Volume}^{j=RV\ at\ 5{,}000{,}000\ MW} Hj}{\sum_{j=RV\ at\ Lowest\ Integrated\ Volume}^{j=RV\ at\ Highest\ Integrated\ Volume} Hj} \quad (10)$$

$$CDF_{LS \ge 10{,}000{,}000\ MW} = \frac{\sum_{j=RV\ at\ Lowest\ Integrated\ Volume}^{j=RV\ at\ 10{,}000{,}000\ MW} Hj}{\sum_{j=RV\ at\ Lowest\ Integrated\ Volume}^{j=RV\ at\ Highest\ Integrated\ Volume} Hj} \quad (11)$$

Low Shear Viscosity and High Shear Viscosity

Test samples were compression molded into a 1.5 inch diameter circles of 3.10 mm thickness at a pressure of 25,000 lbs. for 6.5 min. at 190° C. with a Carver Hydraulic Press (Model #4095.4NE2003). They were cooled to room temperature before testing.

DMS (dynamic mechanical spectroscopy) frequency sweep was conducted using 25 mm parallel plates at frequencies ranging from 0.1 to 500 rad/s. Test gap separating the plates was 2 mm and a 10% strain was applied. Each test was conducted under isothermal conditions and nitrogen atmosphere at 190° C. Prior to initiating the DMS test, the rheometer oven was allowed to equilibrate at the desired testing temperature for at least 30 min. After the testing temperature had equilibrated, the sample was loaded into the rheometer, and the plates were gradually reduced to a gap of 2.8 mm. Any excess material bulging outside the plates was. The sample was then allowed to equilibrate for 2.5 min. before reducing the parallel plates to final test gap of 2 mm. The sample was trimmed again to ensure that no bulge was present, and the test was initiated. During the test, the shear elastic modulus (G'), viscous modulus (G") and complex viscosity were measured. The complex viscosity measured at the frequency of 0.1 rad/s is referred to herein as the low shear viscosity. The complex viscosity measured at the frequency of 100 rad/s is referred to herein as the high shear viscosity.

All tests were conducted on either ARES-G2, DHR-3 or AR-G2 rheometers, all of which were manufactured by TA Instruments. Data analyses were conducted via TA Instruments TRIOS software.

Examples

Starting Polyethylene Resin:

Catalyst Preparation

Preparation of Catalyst Precursor

A titanium trichloride catalyst precursor is prepared in an approximately 7,500 liter glass lined vessel, equipped with pressure and temperature control, and a turbine agitator. A nitrogen atmosphere (<5 ppm H2O) is maintained at all times. Tetrahydrofuran (10,500 lb, 4,800 kg, <400 ppm H2O) is added to the vessel. The tetrahydrofuran (THF) is recovered from a closed cycle dryer, and contains approximately 0.1 percent Mg and 0.3 percent Ti. An 11 percent THF solution" of triethylaluminum is added to scavenge residual water. The reactor contents are heated to 40° C., and 13.7 lb (6 kg) of granular magnesium metal (particle size 0.1-4 mm) is added, followed by 214.5 lb (97.3 kg) of titanium tetrachloride, added over a period of one-half hour.

The mixture is continuously agitated. The exotherm, resulting from the addition of titanium tetrachloride, causes the temperature of the mixture to rise to approximately 44° C. The temperature is then raised to 70° C., and held at that temperature for approximately four hours, then cooled to 50° C. At the end of this time, 522 pounds (238 kg) of magnesium dichloride are added, and heating is initiated to raise the temperature to 70° C. The mixture is held at this temperature for another five hours, then cooled to 35° C., and filtered through a 100 mesh (150 μm) filter to remove solids.

Fumed silica (CAB-O-SIL™ TS-610, manufactured by the Cabot Corporation) (811 lb, 368 kg) is added to the above precursor solution over a period of one hour. The mixture is stirred by means of a turbine agitator during this time, and for four hours thereafter, to thoroughly disperse the silica. The temperature of the mixture is held at 40° C. throughout this period, and a dry nitrogen atmosphere is maintained at all times. The resulting slurry is spray dried using an 8-foot diameter, closed cycle spray dryer equipped with a rotary atomizer. The rotary atomizer is adjusted to give catalyst particles with a D50 on the order of 20-30 μm. The scrubber section of the spray dryer is maintained at approximately +5 to −5° C.

Nitrogen gas is introduced into the spray dryer at an inlet temperature of 140 to 165° C. and is circulated at a rate of approximately 1000-1800 kg/hour. The catalyst slurry is fed to the spray dryer at a temperature of about 35° C. and a rate of 65-150 kg/hour, or sufficient to yield an outlet gas temperature in the range of 100-125° C. The atomization pressure is maintained at slightly above atmospheric. The resulting catalyst particles are mixed with mineral oil, under a nitrogen atmosphere, in a 400 liter, glass lined vessel, equipped with a turbine agitator, to form a slurry containing approximately 28 percent of the catalyst precursor.

Catalyst Precursor Partial Pre-Activation Example 1

The mineral oil slurry of precursor is partially activated by contact at room temperature with an appropriate amount of a 50 percent mineral oil solution of tri-n-hexyl aluminum (TNHA). The catalyst precursor slurry is added to a mixing vessel. While stirring, a 50 percent mineral oil solution of tri-n-hexyl aluminum (TNHA) is added at ratio of 0.17 moles of TNHA to mole of residual THF in the precursor and stirred for at least one hour prior to use.

Polymerization

Ethylene is copolymerized with 1-hexene in a fluidized bed reactor. Polymerization is continuously conducted, after equilibrium was reached, under the conditions shown in Table 1. Polymerization is initiated by continuously feeding the catalyst and cocatalyst (trialkyl aluminum, specifically tri ethyl aluminum or TEAL) into a fluidized bed of polyethylene granules, together with ethylene, 1-hexene and hydrogen. Nitrogen makes up the remaining pressure. The final product is continuously removed.

TABLE 1

| Polymerization Conditions for the Starting Polyethylene Resin | |
|---|---|
| Reactor Temperature ° C. | 86 |
| Reactor Pressure, psig | 350 |
| Ethylene Partial Pressure, psi | 115 |
| Hydrogen/Ethylene Molar Ratio | 0.095 |
| Hexene/Ethylene Molar Ratio | 0.143 |
| Catalyst Feed rate, cc/hr | 4.0 |
| Co-catalyst | 2.5 wt % TEAL |
| Co-catalyst Feed Rate, cc/hr | 200 |
| Production Rate, lb/hr | 40 |
| Bed Weight (lb) | 100 |
| Residence Time, hr | 2.53 |

The resin produced by this process embodiment has a density of 0.9173 g/cc and melt index of 0.503 dg/min.

Free Radical Generator Masterbatch Preparation

A 0.62 wt % masterbatch of 3,6,9-triethyl-3-6-9-trimethyl-1,4,7-triperoxonane peroxide (a free-radical generator) in DOW™ LDPE 722 low density polyethylene resin is made by dispersing Trigonox 301, which is a 41% solution of 3,6,9-triethyl-3-6-9-trimethyl-1,4,7-triperoxonane in isoparaffinic hydrocarbons, over the LDPE pellets, and mixing them in a Henschel mixer at ambient conditions. The masterbatch pellets are stored in aluminum foil lined bags to prevent evaporation of the peroxide. At least one month is given for the peroxide to diffuse and equilibrate in the pellets before using the masterbatch.

Preparation of Modified PE Resin Formulations

Three inventive examples (IE1, IE2 and IE3) and one comparative example (CE1) are prepared by processing the starting polyethylene resin component with the free-radical generator masterbatch and the primary antioxidant, pentaerythrityl tetrakis(3-(3,5-di-tert-butyl-4-hydroxyphenol) propionate) (obtained as Irganox 1010) and the secondary antioxidant tris(2,4-di-tert-butylphenyl)phosphite (obtained as Irgafos 168) in the proportions shown in Table 2. All components of the formulations are fed together to a continuous twin-screw extruder (Kobe Steel, Ltd. LCM-100 continuous mixer with two screws), which is close-coupled to a gear pump, and equipped with a melt filtration device and an underwater pelletizing system. Details of the processing conditions are provided in Table 3.

TABLE 2

Composition of the examples.

| Example | SPEC (wt %) | Primary AO Irganox 1010 (ppmw) | Secondary AO Irgafos 168 (ppmw) | Trigonox 301 Masterbatch (wt %) | Peroxide* (ppmw) |
|---|---|---|---|---|---|
| CE 1 | 99.58 | 2800 | 1400 | 0 | 0 |
| IE 1 | 99.10 | 2800 | 1400 | 0.48 | 30 |
| IE 2 | 98.62 | 2800 | 1400 | 0.96 | 60 |
| IE 3 | 97.97 | 2800 | 1400 | 1.61 | 100 |

*This column describes the amount of the 3,6,9-triethyl-3-6-9-trimethyl-l,4,7-triperoxo-nane peroxide added, derived from the amount of free radical generator masterbatch added and the peroxide content in the masterbatch. Note: Trigonox 301 contains about 41 weight percent peroxide in isoparaffinic hydrocarbons. Examples CE 1 and IE 1 to IE 3 each have a weight/weight ratio of total quantity of primary antioxidant used to total quantity of secondary antioxidant used that is equal to 2.0 and a molar ratio of total moles of phenolic OH groups in the quantity of the primary antioxidant used to total moles of phosphorus atoms in the quantity of the secondary antioxidant used that is equal to 4.4.

TABLE 3

Processing conditions for the examples

| | |
|---|---|
| Barrel Temperature | 180 |
| Oxygen % In Feed Hopper | <1% |
| Oxygen % In Mixer Vent Section | <1% |
| Mixer Speed (rpm) | 310 |
| Feed Rate (lb/hr) | 800 |

Testing of Sample Resins

High, ultra-high, and low molecular weight $CDF_{LS}$ fractions of the modified polyethylene resin formulation are quantified using the cumulative detector fraction via low-angle laser light scattering (CDF-LS) method. The terms "high" molecular weight $CDF_{LS}$ fraction", "ultra-high molecular weight $CDF_{LS}$ fraction", and "low molecular weight $CDF_{LS}$ fraction" of the modified polyethylene resin formulation are not used herein in the sense of a bimodal or trimodal resin. Instead they refer to the $CDF_{LS}$ fraction of the weight of the polymer with a MW below (in the case of the LMW $CDF_{LS}$ fraction) or above (in the case of the HMW and UHMW $CDF_{LS}$ fractions) a specified cut-off molecular weight using the CDF-LS method. The molecular weight cut-off value used for the low molecular weight $CDF_{LS}$ fraction is set at less than the molecular weight cut-off value used for the high molecular weight $CDF_{LS}$ fraction, and which in turn is set at less than the molecular weight cut-off value set for the ultra-high molecular weight $CDF_{LS}$ fraction. For example in the CDF-LS method, the low molecular weight $CDF_{LS}$ fraction may have a molecular weight cut-off value set at 100,000 g/mol (100 kg/mol), the high molecular weight $CDF_{LS}$ fraction may have a molecular weight cut-off value set at 5,000,000 g/mol (5,000 kg/mol), and the ultra-high molecular weight $CDF_{LS}$ fraction may have a molecular weight cut-off value set at 10,000,000 g/mol (10,000 kg/mol). The melt index, density, weight-average molecular weight ($M_w$) (absolute ("abs")), melt strength, and low-shear viscosity of each polyethylene resin formulation are tested using the test methods described above. The results are shown in Table 4.

TABLE 4

Properties of the examples

| Example | Melt Index ($I_2$) (dg/min.) | Density (g/cm3) | Weight-Average Molecular Weight ($M_w$(abs)) g/mol | CDF$_{LS}$ Below 100 kg/mol | CDF$_{LS}$ Above 5000 kg/mol | CDF$_{LS}$ Above 10000 kg/mol | Melt Strength (cN) | Low Shear viscosity (at 0.1 rad/s) (Pa · s) |
|---|---|---|---|---|---|---|---|---|
| CE 1 | 0.50 | 0.917 | 163,700 | 16.28 | 1.00 | 0.11 | 5.2 | 17864 |
| IE 1 | 0.32 | 0.919 | 168,300 | 15.23 | 2.54 | 0.53 | 8.2 | 27522 |
| IE 2 | 0.22 | 0.919 | 180,600 | 14.02 | 4.91 | 1.82 | 9.9 | 38406 |
| IE 3 | 0.15 | 0.918 | 180,400 | 13.99 | 5.95 | 2.54 | 11.6 | 53121 |

As shown in Table 4, the process modified a starting polyethylene resin composition to make a modified polyethylene resin composition. The data in Table 4 show that the melt index ($I_2$) and the molecular weight (MW) $CDF_{LS}$ fraction below 100,000 g/mol decreased significantly going from CE 1 to IE 1 to IE 2 to IE 3. The data in Table 4 also show that going from CE 1 to IE 1 to IE 2 to IE 3 the following properties increased significantly: MW $CDF_{LS}$ fraction above 5,000,000 g/mol; the MW $CDF_{LS}$ fraction above 10,000,000 g/mol; the melt strength; and the complex viscosity at 0.1 radian per second. The data in Table 4 also show that the absolute weight-average molecular weight ($M_w$(abs)) increased somewhat going from CE 1 to IE 1 to IE 2 to IE 3. The data in Table 4 also show that density changed little or substantially not at all going from CE 1 to IE 1 to IE 2 to IE 3.

The melt flow ratio ($I_{21}/I_2$) and polydispersity index or PDI ($M_w$(conv)/$M_n$(conv)) of each polyethylene resin formulation are tested using the test methods described above. The results are shown in Table 5.

TABLE 5

Properties of the examples

| Example | Melt Flow Ratio ($I_{21}/I_2$) | PDI ($M_{w(conv)}/M_{n(conv)}$) | $M_w$ (conv) g/mol | $M_n$ (conv) g/mol | $M_z$ (conv) g/mol | High Shear Viscosity (at 100 rad/s) (Pa-sec) |
|---|---|---|---|---|---|---|
| CE 1 | 28.2 | 4.063 | 150807 | 37116 | 514798 | 2422 |
| IE 1 | 36.2 | 4.097 | 154855 | 37795 | 600849 | 2404 |
| IE 2 | 44.5 | 4.078 | 155767 | 38197 | 564954 | 2379 |
| IE 3 | 59.1 | 4.112 | 155193 | 37740 | 608600 | 2414 |

As shown in Table 5, the process modified a starting polyethylene resin composition to make a modified polyethylene resin composition. The data in Table 5 show that the melt flow ratio ($I_{21}/I_2$) increased significantly from CE 1 to IE 1 to IE 2 to IE 3 while the PDI ($M_w$(conv)/$M_n$(conv)) remained substantially unchanged.

The invention claimed is:

1. A process to make a modified polyethylene formulation, which process comprises the steps of:

a) providing a starting polyethylene resin composition (SPEC) containing one or more polyethylene (co) polymer(s), wherein the SPEC has a melt index (12) of from 0.5 dg/min to 5 dg/min and contains i) from 0 to no more than 1.5 weight percent (based on the total weight of SPEC) of a high molecular weight Cumulative Detector Fraction-Light Scattering ($CDF_{LS}$) fraction with a molecular weight (MW) of greater than 5,000,000 grams per mole (g/mol) and ii) from 0 to no more than 0.3 weight percent (based on the total weight of SPEC) of an ultra-high molecular weight $CDF_{LS}$ fraction with a molecular weight (MW) of greater than 10,000,000 g/mol;

b) extruding and mixing together in a melt i) the SPEC, ii) a total quantity of one or more primary antioxidants that is effective to provide a concentration of least 2001 parts of the one or more primary antioxidants per 1 million parts by weight of the modified polyethylene formulation ("ppmw"), and iii) from 11 to 250 parts of free-radical generator per 1 million parts of the SPEC, by weight ("ppmw"), and iv) optionally, a total quantity of one or more secondary antioxidants that is effective to provide a concentration of at least 395 ppmw of the one or more secondary antioxidants in the modified polyolefin formulation, wherein the one or more primary antioxidants and the optional one or more secondary antioxidants are collectively referred to as the "primary and any secondary antioxidant(s)";

wherein the melt is maintained at a temperature and for a time sufficient to substantially decompose the free-radical generator without substantially degrading the polyethylene resin or the one or more primary antioxidants, such that a modified polyethylene formulation is produced which has:

(i) a modified polyethylene resin component (MPEC) having

1. At least 2 weight percent (based on the total weight of MPEC) of a high molecular weight $CDF_{LS}$ fraction with a molecular weight (MW) of greater than 5,000,000 g/mol and 2. At least 0.3 weight percent (based on the total weight of MPEC) of an ultra-high molecular weight $CDF_{LS}$ fraction with a molecular weight (MW) of greater than 10,000,000 g/mol; and (ii) a total of at least 2,001 parts of the one or more primary antioxidant per 1 million parts of the MPEC by weight (ppmw); and (iii) less than 10 weight percent of polyethylene gels (based on the total weight of MPEC), and (iv) optionally, a total of at least 395 ppmw of the one or more secondary antioxidants.

2. The process of claim 1 characterized by any one of limitations (i) to (vii): (i) wherein at least some of the from 11 to 250 ppmw of the free-radical generator is added before the adding of the primary and any secondary antioxidant(s); (ii) wherein at least some of the from 11 to 250 ppmw of the free-radical generator is added simultaneously with the adding of the primary and any secondary antioxidant(s); (iii) wherein at least some of the from 11 to 250 ppmw of the free-radical generator is added after the adding of the primary and any secondary antioxidant(s); (iv) a combination of (i) and (ii) but not (iii); (v) a combination of (i) and (iii) but not (ii); (vi) a combination of (ii) and (iii), but not (i); and (vii) a combination of each of (i), (ii), and (iii).

3. The process of claim 1 wherein all of the from 11 to 250 ppmw of the free-radical generator is added after or simultaneously with the adding of the primary and any secondary antioxidant(s).

4. The process of claim 1 wherein all of the from 11 to 250 ppmw of the free-radical generator is added simultaneously with the adding of the primary and any secondary antioxidant(s).

5. The process of claim 1 wherein the free-radical generator is an organic peroxide having a molecular weight of 200 to 1000 g/mol and the free-radical generator is added in a quantity of 20 to 250 parts free radical generator per one million parts of SPEC, by weight.

6. The process in claim 1 characterized by any one of limitations (i) to (iii): (i) wherein and the one or more secondary antioxidants is/are used and the total quantity of the one or more secondary antioxidants that is added is effective to provide from 400 to 2000 ppmw of the one or more secondary antioxidants in the modified polyethylene formulation (based on the weight of MPEC); (ii) wherein the MPEC has a total of from 2001 to 4500 ppmw of the one or more primary antioxidants (based on the weight of MPEC); and (iii) both (i) and (ii).

7. The process in claim 1 wherein melt strength of the modified polyethylene formulation is at least 2 cN higher than the melt strength of the starting polyethylene resin component.

8. The process in claim 1 wherein melt-index ($I_2$) of the modified polyethylene formulation is from 0.05 dg/min to 2.0 dg/min.

9. The process of claim 1 wherein the content of the high molecular weight $CDF_{LS}$ fraction with a molecular weight (MW) of greater than 5,000,000 g/mol in the modified polyethylene formulation is between 2.4 weight percent and 30 weight percent, based on the total weight of MPEC.

10. The process of claim 1 wherein the content of the ultra-high molecular weight $CDF_{LS}$ fraction with a molecular weight (MW) of greater than 10,000,000 g/mol in the modified polyethylene formulation is between 0.4 weight percent and 15 weight percent, based on the total weight of MPEC.

11. The process of claim 1 wherein the modified polyethylene formulation contains less than 3 weight percent gels based on the weight of MPEC.

12. The process of claim 1 wherein the starting polyethylene resin component contains less than 0.20 vinyl groups per 1000 carbon atoms.

13. The process of claim 1 wherein the process is carried out in an extruder-pelletizer.

14. The process of claim 1 wherein the process is carried out in multiple extruders, by extruding the starting polyethylene resin component on a first extruder with part of the free-radical generator and/or the primary and any secondary antioxidant(s) and then extruding the resulting composition again on a second extruder with the remaining free-radical generator and/or the primary and any secondary antioxidant (s); wherein either: (a) the first and second extruders are in communication with a conveying operation all located in a same manufacturing plant and the composition resulting from the first extruder is fed to the second extruder via the conveying operation; or (b) the first and second extruders are located in different manufacturing plants and the composition resulting from the first extruder is transported by vehicle therebetween.

15. A modified polyethylene formulation made by the process of claim 1.

* * * * *